US012697849B2

(12) United States Patent
Trescott et al.

(10) Patent No.: US 12,697,849 B2
(45) Date of Patent: Aug. 4, 2026

(54) VEHICLE SUSPENSION EVENT RECORDING AND/OR REPORTING SYSTEM

(71) Applicant: FORD GLOBAL TECHNOLOGIES, LLC, Dearborn, MI (US)

(72) Inventors: Calvin Trescott, Northville, MI (US); Keith Weston, Canton, MI (US); Michael Alan Mcnees, Flat Rock, MI (US); Stuart C. Salter, White Lake, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 18/221,166

(22) Filed: Jul. 12, 2023

(65) Prior Publication Data

US 2025/0018762 A1    Jan. 16, 2025

(51) Int. Cl.
*B60G 17/019* (2006.01)

(52) U.S. Cl.
CPC .... *B60G 17/019* (2013.01); *B60G 2400/0512* (2013.01); *B60G 2400/204* (2013.01); *B60G 2400/252* (2013.01); *B60G 2400/922* (2013.01); *B60G 2401/142* (2013.01); *B60G 2401/16* (2013.01); *B60G 2600/0422* (2013.01)

(58) Field of Classification Search
CPC ............. B60W 2520/10; B60W 50/14; B60W 2420/403; B60W 2556/50; B60W 2554/00; B60W 2554/4041; B60W 2050/146; B60W 40/10; A63H 17/004; A63H 18/028
USPC .................................................. 701/38, 33.4
See application file for complete search history.

(56) References Cited

U.S. PATENT DOCUMENTS

<table>
<tr><td>5,636,146 A</td><td>6/1997</td><td>Flentov et al.</td></tr>
<tr><td>6,542,077 B2 *</td><td>4/2003</td><td>Joao ...................... B60R 25/102<br>340/425.5</td></tr>
<tr><td>6,678,631 B2 *</td><td>1/2004</td><td>Schiffmann ......... B60R 21/0133<br>340/440</td></tr>
</table>

(Continued)

FOREIGN PATENT DOCUMENTS

<table>
<tr><td>BR</td><td>112019027564 A2</td><td>7/2020</td></tr>
<tr><td>CN</td><td>108297872 A</td><td>7/2018</td></tr>
</table>

(Continued)

OTHER PUBLICATIONS

GM Truck PDR NPL; Journal Article; Published to the internet Feb. 2022; URL: https://gmauthority.com/blog/2022/02/gm-suvs-and-trucks-should-offer-performance-data-and-video-recorder-opinion/ (Year: 2022).*

(Continued)

*Primary Examiner* — Lindsay M Low
*Assistant Examiner* — Brian R Kirby
(74) *Attorney, Agent, or Firm* — Burr & Forman; Lorne Forsythe

(57) ABSTRACT

A vehicle monitoring system may include a sensor network operably coupled to suspension components of the vehicle and a controller operably coupled to the sensor network to determine a suspension event and vehicle speed, initiation angle and duration time associated with the suspension event. The controller further determines a vertical and/or horizontal component of the distance traveled during the suspension event based on the vehicle speed, initiation angle and duration time.

19 Claims, 4 Drawing Sheets

(56) References Cited

U.S. PATENT DOCUMENTS

| | | | | |
|---|---|---|---|---|
| 6,795,757 | B2 * | 9/2004 | Sadahiro | H04N 7/18 |
| | | | | 348/148 |
| 7,680,639 | B2 * | 3/2010 | Schoeggl | G01M 17/007 |
| | | | | 434/66 |
| 8,352,122 | B2 * | 1/2013 | Hasegawa | B62K 25/04 |
| | | | | 280/755 |
| 10,406,882 | B2 | 9/2019 | Lakehal-Ayat et al. | |
| 10,821,968 | B2 | 11/2020 | Cho et al. | |
| 11,007,837 | B2 | 5/2021 | Mohamed et al. | |
| 2002/0116147 | A1 * | 8/2002 | Vock | G01P 3/50 |
| | | | | 702/182 |
| 2004/0135677 | A1 * | 7/2004 | Asam | A63F 13/803 |
| | | | | 340/988 |
| 2005/0209763 | A1 * | 9/2005 | Offerle | B60W 10/18 |
| | | | | 701/90 |
| 2007/0135979 | A1 * | 6/2007 | Plante | G08G 1/0175 |
| | | | | 701/33.4 |
| 2007/0162204 | A1 * | 7/2007 | Moshchuk | B60W 40/114 |
| | | | | 701/38 |
| 2007/0185623 | A1 * | 8/2007 | Chen | B60W 30/04 |
| | | | | 701/1 |
| 2008/0133066 | A1 * | 6/2008 | Takenaka | B62D 6/003 |
| | | | | 701/1 |
| 2008/0270519 | A1 * | 10/2008 | Ekdahl | G07C 5/008 |
| | | | | 701/33.4 |
| 2008/0306653 | A1 * | 12/2008 | Hasegawa | F02D 29/02 |
| | | | | 701/99 |
| 2013/0096793 | A1 * | 4/2013 | Krosschell | F16H 63/067 |
| | | | | 701/68 |
| 2014/0036252 | A1 * | 2/2014 | Amzajerdian | G01S 17/875 |
| | | | | 356/28 |
| 2014/0247352 | A1 * | 9/2014 | Rathi | G06V 20/588 |
| | | | | 348/148 |
| 2015/0057885 | A1 * | 2/2015 | Brady | B60G 17/0164 |
| | | | | 701/37 |
| 2015/0100208 | A1 * | 4/2015 | Wogel | B60R 21/013 |
| | | | | 701/45 |
| 2016/0059660 | A1 * | 3/2016 | Brady | B60G 17/0165 |
| | | | | 701/37 |
| 2016/0300378 | A1 * | 10/2016 | Thomas | H04N 5/765 |
| 2018/0061243 | A1 * | 3/2018 | Shloosh | G08G 5/21 |
| 2018/0141543 | A1 * | 5/2018 | Krosschell | B60W 30/04 |
| 2018/0224851 | A1 * | 8/2018 | Park | B60W 60/001 |
| 2018/0362048 | A1 | 12/2018 | Juno | |
| 2019/0023095 | A1 | 1/2019 | Ficca et al. | |
| 2019/0031252 | A1 * | 1/2019 | Demetrio | B62D 35/02 |
| 2019/0160905 | A1 * | 5/2019 | Sandberg | B60G 13/04 |
| 2020/0016951 | A1 * | 1/2020 | Letizio | B60G 17/0165 |
| 2020/0171906 | A1 * | 6/2020 | Murakami | B62K 25/04 |
| 2020/0368629 | A1 * | 11/2020 | Moss | A63H 17/21 |
| 2021/0097302 | A1 * | 4/2021 | Butcher | G06F 18/24 |
| 2021/0129650 | A1 * | 5/2021 | Gaither | B60K 1/00 |
| 2022/0024445 | A1 * | 1/2022 | Anker | B60W 30/02 |
| 2022/0297495 | A1 * | 9/2022 | Sawarynski | B60G 17/0165 |

FOREIGN PATENT DOCUMENTS

| | | |
|---|---|---|
| CN | 113752773 A | 12/2021 |
| CN | 113829822 A | 12/2021 |
| CN | 114572183 A | 6/2022 |
| CN | 115320310 A | 11/2022 |
| JP | 4744327 B2 | 8/2011 |
| JP | 2021192997 A | 12/2021 |
| KR | 20130019942 A | 2/2013 |
| KR | 2022015172 A | 2/2022 |
| KR | 20220084621 A | 6/2022 |
| WO | 2020127077 A1 | 6/2020 |

OTHER PUBLICATIONS

Corvette PDR NPL; Journal Article, Published to the Internet Feb. 2023; URL: https://www.designnews.com/automotive-engineering/cosworth-performance-data-recorder-provides-corvette-video (Year: 2023).*

* cited by examiner

VEHICLE SUSPENSION EVENT RECORDING AND/OR REPORTING SYSTEM

TECHNICAL FIELD

Example embodiments generally relate to vehicle monitoring algorithms and, more particularly, relate to a monitoring system for determining when a suspension event occurs and recording or reporting parameters regarding the same.

BACKGROUND

Many vehicle drivers enjoy operating their vehicles in off road conditions. Consequently, an entire market has developed for vehicles that excel in operating in off road environments, and courses exist for enthusiasts to put their vehicles to the test in such challenging environments. These environments may cause drivers to encounter challenging surfaces, which may in some cases also be inclined to varying degrees. When inclines are encountered at certain speeds, the vehicle may encounter various suspension events, which may be of interest to the driver and/or the community of enthusiasts, friends, etc., who share an interest in these activities or may wish to monitor results of such events. Yet, at least presently, there is no convenient, accurate and prudent way to generate and share content within this context using the sensors of the vehicle.

BRIEF SUMMARY OF SOME EXAMPLES

In accordance with an example embodiment, a vehicle monitoring system for a vehicle may be provided. The vehicle monitoring system may include a sensor network operably coupled to suspension components of the vehicle and a controller operably coupled to the sensor network to determine a suspension event and vehicle speed, initiation angle and duration time associated with the suspension event. The controller further determines a vertical and/or horizontal component of the distance traveled during the suspension event based on the vehicle speed, initiation angle and duration time.

In another example embodiment, a method of monitoring vehicle operation for a suspension event may be provided. The method may include receiving sensor information from a sensor network of the vehicle, determining when a suspension event occurs based on the sensor information, determining vehicle speed and initiation angle at a start of the suspension event and duration time associated with the suspension event responsive to an end of the suspension event, and determining a vertical and/or horizontal component of distance traveled during the suspension event based on the vehicle speed, initiation angle and the duration time.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
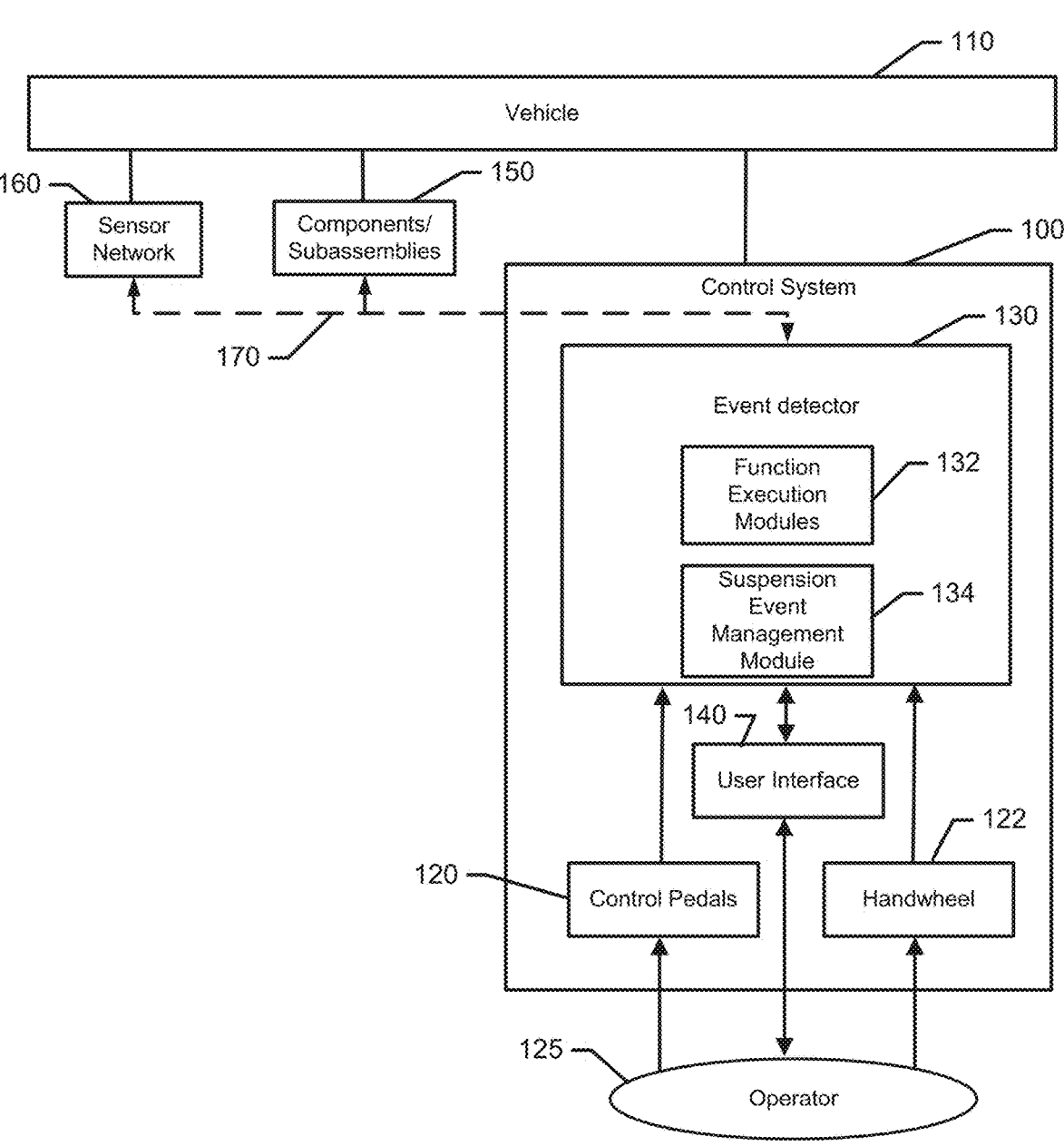
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Modern vehicles often employ a number of electronically controlled components. Some of that electronic control necessitates the provision of various sensors or suites of sensors to provide monitoring for various conditions or triggers that are used to cause certain control functions. These sensors or sensor suites effectively provide a built-in backbone or platform for technological capability that does not necessarily have to be employed in connection with control functions, but could be used for other interesting or useful purposes. One such technological capability may be the ability to monitor for conditions indicative of the vehicle being involved in various suspension events that, for example, may include cycling the suspension system between full droop and the initiation of compression (i.e., the end of the full droop condition). When such conditions occur, and the vehicle therefore executing a suspension event, there are currently existing technologies associated with adjusting various suspension characteristics in order to prepare the vehicle to be prepared for contact with the ground and increased compression when the suspension event concludes. However, various other functions either capable due to equipment already in the vehicle sensor suites, or added thereto, may also be used to determine interesting information about the suspension event, record such information, and even further enable easy or seamless sharing of such information via various content sharing platforms.

Example embodiments described herein relate to the provision (or adaptation) of a vehicle control system that is enabled to detect suspension events and record and/or share information about such events when detected. That said, such operations described herein should always be implemented and/or performed in accordance with the owner's manual and operating guidelines.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals, wheels, buttons, levers, etc. In some embodiments, the control pedals may include a foot-operated brake pedal and/or speed control pedal (e.g. throttle). The brake and speed control pedals may, more generally, be pedals or controllers for providing negative and positive propulsive torque inputs and may therefore be referred to as control pedals 120. However, the control pedals 120 could alternatively be hand operated or any other operable member via which an operator 125 may provide an input indicative of an intent of the operator 125 relative to controlling the provision of positive and negative torque for application to the wheels of the vehicle 110. Another example input device may include a steering wheel (or handwheel 122). The handwheel 122 may be rotatable by the operator 125 to provide an input indicative of an intent of the operator 125 relative to controlling a direction of travel of the vehicle 110, typically through control of the turning of the front wheels of the vehicle 110.

The control system 100 may also include an event detector 130 that detects various events or situations based on inputs thereto. The event detector 130 of some example embodiments may include one or more instances of a function execution module 132, each of which may perform a specific function in response to a corresponding detection of an event or set of stimuli that are configured to trigger the performance of the specific function of each function execution module 132. One example of, and therefore one example instance of, the function execution module 132 may be a suspension event management module 134, which will be described in greater detail below.

The event detector 130 may be operably coupled to a user interface 140. The user interface 140 may be located within the vehicle 110, and may take many forms that permit one way (i.e., to the user) or two way (i.e., to and from the user) provision of information. For example, the user interface 140 may include a display of the vehicle 110 and/or any other means by which to provide visual, audible, and/or haptic feedback to the operator 125. The user interface 140 may therefore include lights, screens, buttons, microphones, speakers, and/or the like.

Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170. Thus, many of the signals provided to the event detector 130 may be provided via the vehicle communication bus 170 (or CAN bus). By monitoring the CAN bus, the event detector 130 may determine vehicle status to include vehicle attitude and the ability to detect when a suspension event has occurred. The suspension event management module 134 may take various action in response to the detection of the suspension event. Thus, it may be appreciated that the suspension event management module 134, and the sensor network 160 may form or otherwise be included portions of a monitoring system that is either a portion of the control system 100, or which the control system 100 itself may act as. Thus, for example, one or more corresponding sensors of the sensor network 160 may be operably coupled to the suspension event management module 134 (and/or other modules of the vehicle 110) to provide input information to the suspension event management module 134 for consideration and control thereby. The resultant vehicle monitoring system may, among other things, be provided with configured processing circuitry that is configured to enable to the corresponding system to determine the occurrence of a suspension event. The system may also determine vehicle speed, initiation angle and duration time associated with the suspension event so that a vertical and/or horizontal component of the distance traveled during the suspension event may be determined (e.g., based on the vehicle speed, initiation angle and duration time).

Vehicle attitude may be defined as the orientation of the vehicle 110 relative to the normal direction of travel (which may be assumed to be on a flat horizontal surface). Thus, the vehicle attitude may be normal whenever the vehicle is operating on a flat surface, and the vehicle attitude may change in the x-z plane when encountering an up or down slope directly ahead of or behind the vehicle. The vehicle attitude may similarly change when the speed of the vehicle 110 is sufficient, when encountering an up slope, to cause the vehicle 110 to execute a suspension event. These changes in the x-z plane may be referred to as pitch. The vehicle attitude may also change in the y-z plane when encountering side slopes, which tend to slope normal to the direction of travel of the vehicle 110. These changes in the y-z plane are referred to as roll. Any twisting of the vehicle 110 about the z axis may be referred to as yaw. The vehicle 110 may also encounter varying degrees of yaw, pitch and roll at the same time, and the combination of these effects causes corresponding changes in orientation of the vehicle 110 that can be referred to as vehicle attitude.

In an example embodiment, the control system 100 may receive information that is used to determine vehicle status from various components or subassemblies 150 of the vehicle 110. The components or subassemblies 150 may include the control pedals 120, the handwheel 122 and any number of other components. The components or subassemblies 150 may also include, for example, a braking system, a propulsion system, a steering system, and/or a wheel assembly of the vehicle 110. The braking system may be configured to provide braking inputs to braking components of the vehicle 110 (e.g., electro-mechanical brakes, friction brakes, hydraulic brakes, regenerative brakes, etc.). The braking system may also include more than one type of braking hardware. The propulsion system may include one or more instances of an electric motor, a gasoline engine or any other suitable propulsion device. In some cases, the propulsion system may also incorporate drive-by-wire components and a corresponding control paradigm.

The sensors of the sensor network 160 may include pedal position sensors, handwheel position sensors, and any number of other sensors. In some cases, the sensors may include a gyroscope, ride height sensors, pitch rate sensors, roll rate sensors, an inertial measurement unit (IMU), RCM or other sensors for measuring motion and/or inclination of the vehicle (e.g., orientation) in the various directions to determine vehicle attitude. The sensors of the sensor network 160 may also include sensors for detecting vehicle speed, output torque, or other useful parameters. Any of all of the parameters measured may be communicated to the event detector 130, which may utilize the parameters received to determine, perhaps among other things, the vehicle attitude. Thus, the event detector 130 may be capable of determining when the vehicle 110 is inclined up, down, or to the right or left side of the vehicle 110, or whether more complicated combinations of incline are being encountered and what is determined may be generally referred to as attitude information.

The control system 100 of FIG. 1 may be similar to conventional systems in many respects, except that, the control system 100 (and in some cases specifically the suspension event management module 134) may be modified to respond to situations in which a suspension event is detected as described in greater detail in reference to FIGS. 2 and 3 below.

Figure 2:
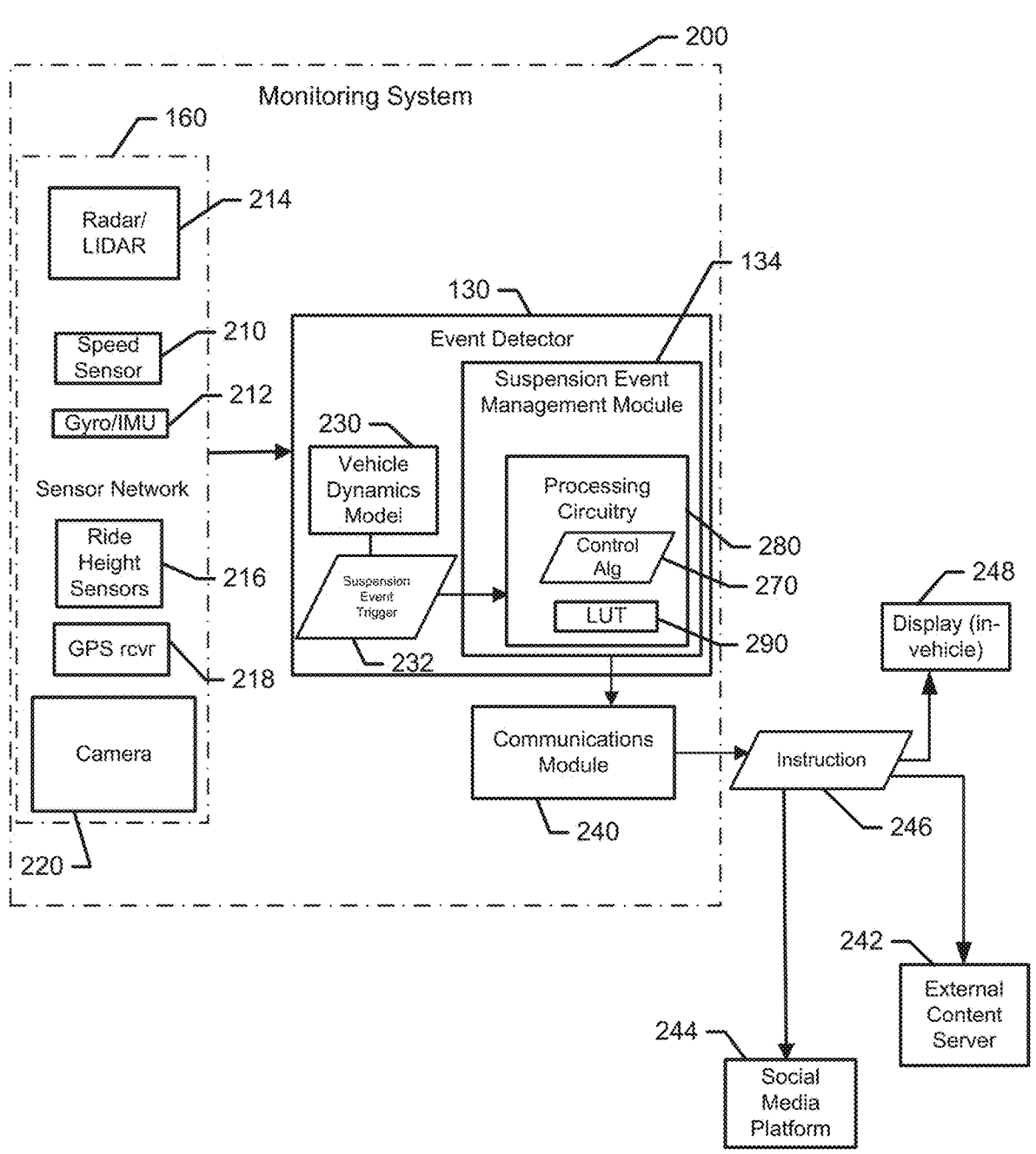
FIG. 2 illustrates a block diagram of some components of the vehicle monitoring system in accordance with an example embodiment.
Figure 3:
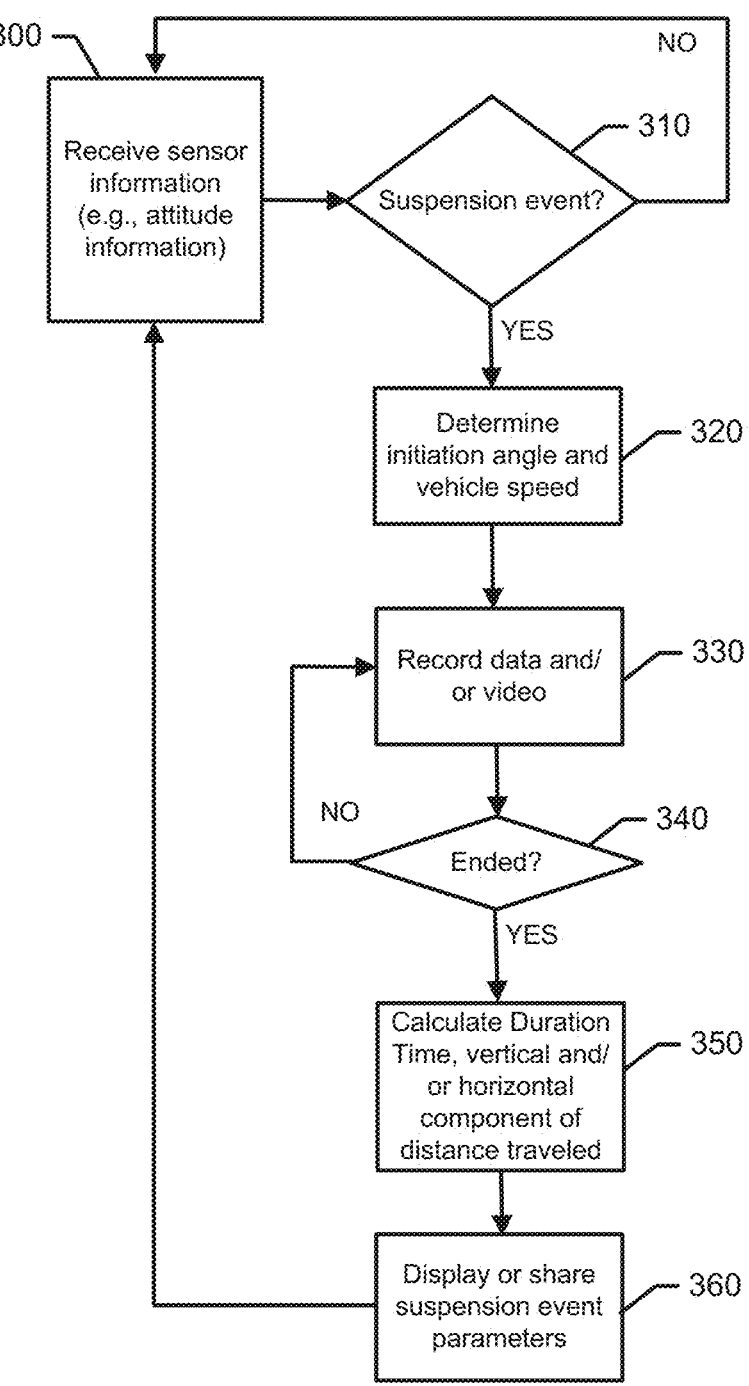
FIG. 3 illustrates a block diagram of operations that may be associated with execution of a control algorithm of an example embodiment.

FIG. 2 illustrates a block diagram of various components of a monitoring system 200 (which is a specific example of portions of (or one programmable function of) the control system 100 of FIG. 1) in greater detail. In this regard, for example, FIG. 2 illustrates various ones of the components of FIG. 1 in a particular arrangement in which various examples of sensors of the sensor network 160 are shown in communication with the suspension event management module 134. However, it should be appreciated that some example embodiments may use only selected ones (in any combination) or all of the individual sensors of the sensor network 160.

As shown in FIG. 2, the monitoring system 200 may include the various sensors of the sensor network 160 providing sensor data and information to the event detector 130. The sensor network 160 may include any or all of a speed sensor 210, a gyroscope or inertial measurement unit (IMU) (e.g., gyro/IMU 212), a radar or LIDAR (e.g., radar/LIDAR 214), one or more ride height sensors 216, a global positioning system (GPS) receiver 218, and a camera 220 (or multiple cameras).

The speed sensor 210 may provide vehicle speed, or individual wheel speeds to the event detector 130. The event detector 130 may further be capable of determining rate of change of speed for any individual speed value received. However, in some cases, such rates of change in speeds may be calculated individually and provided to the event detector 130. Moreover, in some cases, the gyro/IMU 212 may compute or otherwise provide information regarding speeds and rates of change in speeds in each of multiple directions (e.g., x, y, and z directions) and corresponding vector components of speeds or rates of change in speeds for each applicable direction. The GPS receiver 218 may also or alternatively provide speed and rate of change of speed information, which may also be broken down in terms of vector components in various directions in some cases. Thus, any or all of the speed sensor 210, the gyro/IMU 212 and the GPS receiver 218 may be used for obtaining speed information and/or rate of change of speed information associated with different directions and therefor may also be able to determine or contribute information helpful in determining vehicle attitude information and calculating various aspects of or characteristics of a suspension event.

Meanwhile, in some cases at least, the determination of the suspension event itself may be accomplished with the assistance of (or entirely by) the ride height sensors 216, the radar/LIDAR 214 and/or the camera 220. In this regard, for example, when the suspension components of the vehicle 110 are in full droop (or at a full rebound position), it may be understood that the vehicle 110 is not exerting any contact forces on the ground. The ride height sensors 216 may indicate full droop (or full rebound) when a maximum droop value is measured, or when a ride height above a threshold value for all four wheels is measured for at least a predetermined period of time. Thus, for example, a timer may be consulted to ensure that the vehicle (e.g., or the front suspension of the vehicle) is at the full rebound or droop position (or within a predetermined range of those positions such as, for example, within 25 mm of full droop or rebound) for at least a threshold or predetermined amount of time in order to confirm the existence of the suspension event. Rear suspension reaction may also be considered based on a calibratable wheel base related parameter. Ending of the suspension event may be confirmed based on front suspension passing through the range noted above (e.g., within 25 mm of full droop or rebound). In some cases, the transition from some other ride height value (less than the maximum droop value) to the maximum droop value may indicate the point at which the vehicle 110 starts a suspension event (e.g., ceases to exert contact forces on the ground). Likewise, the transition from the maximum droop value to some other ride height value (less than the maximum droop value) may indicate the point at which the vehicle 110 ends a suspension event (e.g., resumes exertion of forces on the ground). Radar or LIDAR may similarly measure distances from a point on the chassis of the vehicle 110 upon which the radar/LIDAR 214 is mounted to the ground, and may be used either to detect the start and end of the suspension event when a maximum distance achievable while wheels remain in contact with the ground is exceeded and subsequently re-encountered. The camera 220 (or cameras) may also be used to confirm (e.g., visually) that the wheels no longer exert contact forces on the ground, or to detect the start and end of the suspension event visually.

The event detector 130 may, in some cases, include a vehicle dynamics model 230 that records information such as the maximum droop value for detecting the suspension event via the ride height sensors 216, the maximum distance achievable while wheels continue to exert contact forces on the ground for detecting the suspension event via the radar/LIDAR 214, and/or other characteristic parameters that, when measured, indicate the start or end of the suspension event. Moreover, the vehicle dynamics model 230 may include other model data and information that can be used to determine initiation angle (via pitch measurements or vehicle attitude information), and the distance the vehicle 110 travels at each of multiple different initiation angles for respective speeds and/or duration times. In this context, the duration time may be directly calculated or estimated based on the start and end of the suspension event as indicated above.

Accordingly, for example, the vehicle dynamics model 230 may be used by the event detector 130 in association with information provided by the radar/LIDAR 214, the ride height sensors 216 and/or the camera 220 to detect the start of the suspension event and/or the end of the suspension event. The start and end of the suspension event may be referred to as suspension event triggers 232, and may be used by the suspension event management module 134 to determine how to calculate an amount of time the vehicle 110 is not exerting contact force on the ground or at full droop (i.e., duration time), and therefore also the horizontal and/or vertical component of the distance traveled while not exerting contact force via the suspension system along with other possible parameters descriptive of the suspension event using information provided by other sensors (e.g., the speed sensor 210, the gyro/IMU 212 and/or the GPS receiver 218). In this regard, for example, the determination of vehicle speed at the start of the suspension event along with an understanding of vehicle attitude (e.g., vehicle pitch or initiation angle at the start of the suspension event), and further with a determination of duration time (determined when the end of the suspension event is reached), may enable a calculation of various other parameters associated with the suspension event. The parameters that may be calculated may include vertical and/or horizontal distance traveled.

An updated (or even updatable) vehicle dynamics model 230 that accounts for specific features or characteristics of the vehicle 110 (e.g., weight, wheelbase, length, center of gravity, etc.) may further enhance accuracy of the calculations made. Moreover, in some cases, machine learning may be employed to further update the vehicle dynamics model 230 over time for a given vehicle or for a class of similar vehicles. To facilitate fleet wide information sharing and learning, a communications module 240 may be provided in communication with the event detector 130 and/or the suspension event management module 134. The communications module 240 may share suspension event information with a remote server (e.g., external content server 242), which may host a machine learning module or other storage and analysis tools for use across multiple vehicles. In an example embodiment, the external content server 242 may further analyze suspension event information received to detect or diagnose maintenance issues associated with a single or multiple suspension events, thereby defining a pathway for maintenance protocols to be developed in association with suspension event activity and/or the active control of suspension system components to prepare the vehicle for properly or best handling the end of the suspension event.

Thus, for example, the communications module 240 may in some cases be an example of a V2I (vehicle-to-infrastructure) resource. The information shared within a V2I context may be used to inform other vehicles that enter an area encountered by a first vehicle that records a suspension event of the existence of the suspension event at the location, and also the suspension event parameters (e.g., tire pressure, pre-initiation vehicle speed, etc.). The other vehicles may therefore be appraised of the possibility of encountering a suspension event at the location, and be given some further idea of the magnitude of the event to be encountered if similar initial conditions are presented. However, in general terms, the communications module 240 may provide a means by which to provide over-the-air (OTA) updates to the equations or methods employed by the control algorithm 270, the LUT 290, or any other on-board equipment in addition to providing a data acquisition tool for extraction of information from the vehicle 110.

In some embodiments, the remote server may further (or alternatively) be associated with social media for content sharing. Social media platform 244 is an example of such a remote server. An instruction 246 may be wirelessly communicated via the communications module 240 to either (or both) of the external content server 242 and the social media platform 244 to communicate and/or display suspension event information for analysis or content sharing. In some cases, the instruction 246 may be used to communicate information directly or indirectly to an application (e.g., on a cell phone or tablet of the operator 125) for recording and/or displaying suspension event parameters. However, external communication could also be wired instead of wireless, and in some cases may be communicated internally (e.g., to an in-vehicle display 248).

In some example embodiments, the suspension event management module 134 may execute a control algorithm 270 via processing circuitry 280 (e.g., a processor and memory) in order to utilize the suspension event information (e.g., vehicle speed, initiation angle and duration time) to determine distance traveled (e.g., horizontally and/or vertically) during the suspension event. In this regard, for example, the control algorithm 270 may define operations for calculating suspension event parameters based on the information provided thereto (and in some cases further based on the vehicle dynamics model 230). However, it should be appreciated that no model is necessarily required and, in some cases, calculations may be made based only on mathematical calculations driven by simple geometry and the suspension event information. Yet, it should also be appreciated that enhanced accuracy may be achieved by incorporating more complex mathematical principles and/or modeling. For example, if the vehicle 110 begins the suspension event from one elevation and ends the suspension event at another, the duration time and simple geometry may not provide an accurate picture of the vertical and/or horizontal distance traveled during a suspension event. The suspension event management module 134 may therefore employ GPS elevation data (e.g., from GPS receiver 218) to determine when suspension events occur on uneven terrain and apply correction factors or modifications to account for the uneven terrain by accounting for relative differences in altitude at the start and end of the suspension event.

As noted above, the attitude information may include information about the orientation of the vehicle 110 relative to pitch, roll, yaw, or combinations thereof. The attitude information may further include or be augmented with information regarding vehicle speed or current output torque. All of these, when provided to the control algorithm 270 may be used to determine complex modifications to the otherwise relatively simple geometrical calculations of distance traveled based on initiation angle, initial speed when the suspension event occurs, and duration time to the endpoint of the suspension event.

In an example embodiment, the processing circuitry 280 may include or have access to a lookup table (LUT) 290, which may store equations used to calculate suspension event parameters and, in some cases, may also define relevant modifications (similar to the vehicle dynamics model 230) to account for variations to the initiation angle associated with pitch, roll and yaw combinations. The lookup table 290 may be created during vehicle development to define values or modifications to values that apply in various situations that may be detected during (or at the start of) a suspension event. The lookup table 290 may, in some cases, enable the outputs generated to consider loading on the vehicle 110. Thus, for example, the ride height sensors 216 mentioned above, or other sensors capable of detecting information indicative of vehicle loading may allow consideration of loading when applying controls as described herein.

Equations used for calculating the suspension event parameters may, for example, include calculations for determining x and y components of speed, which may in turn be used to determine distance traveled in respective directions. For example, the x component of vehicle speed may be the vehicle speed multiplied by the cosine of the initiation angle. Similarly, the y component of vehicle speed may be the vehicle speed multiplied by the sine of the initiation angle. Theoretical time of the suspension event (e.g., time at full droop if no obstructions or topographical changes were present) may be calculated as two times the y component of speed divided by the gravitational constant (g). Theoretical range (e.g., the horizontal component of distance traveled if no obstructions or topographical changes were present) may be calculated as two times the x and y component of speed divided by the gravitational constant (g). Maximum theoretical height gain may be calculated as two times the y component of speed divided by two times the gravitational constant (g).

The LUT 290 may also store correction factors to account for tire slip, tire pressure and/or other variables. Thus, for example, the location of the vehicle 110 (e.g., based on GPS) may be used to determine information associated with the terrain that may be used to estimate tire slip. The tire slip may be applied to the torque applied or vehicle speed to determine a theoretical initiation speed that may be slightly different than vehicle speed otherwise measured going into a suspension event.

As noted above, radar (or LIDAR) information may be used to enhance accuracy of information measured. Distance from the ground, and its attendant changes during a suspension event may therefore be directly measured via radar (or LIDAR). Thus, the radar/LIDAR 214 of FIG. 2 may take many forms. B-pillar radar employed on some vehicles may provide a capability for 180 degree measurements, with sampling available every 20 msec. Front ADAS radar may also supplement some of the information described above in some cases.

Moreover, cameras of various types may be used to either gather enhanced accuracy information, confirm various situations (e.g., starting and ending the suspension event), or simply to gather video information that may be shared (e.g., via the social media platform 244). The camera 220 of FIG. 2 may therefore be understood to include any or all of a dash-cam (e.g., DVR recorder), a security camera, a windshield camera, rear view mirror camera, surround view camera, off-road camera, AV motion control, or other special purpose cameras. Although not required, the instruction 246 may include information associated with branding (e.g., of the vehicle manufacturer, of the vehicle model, of a race or driving team, etc.). Thus, for example, video recorded may be presented with the branding information superimposed thereon, or otherwise with title or heading information for recorded video that includes branding and/or date/time, location, suspension event parameters, etc., to enable viewers to appreciate sourcing and content associated with video content recorded.

It should also be appreciated that some vehicles may include all of the equipment necessary to employ the techniques above, and may only require a software module to be loaded onto the vehicle 110 to enable the functionality described above to be employed using the equipment already resident on the vehicle 110. Thus, for example, CAN bus information from the RCM, VDM (vehicle dynamics module), APIM (accessory protocol interface module), ABS module, etc. may be processed using the techniques described above. In this regard, the RCM may generally report information associated with rates of change of speed in x, y and z directions at any given time. The ABS module may determine pitch, which may be used to determine initiation angle (i.e., pitch at the start of the suspension event) and/or ending angle (i.e., pitch at the end of the suspension event). The APIM may report GPS speed data, the VDM may report suspension ride height, and time may generally be available on the CAN bus.

In some cases, the functionality described above may be associated with a particular vehicle operating mode. Thus, for example, the operator 125 may actuate a button or switch to activate a suspension event mode in which the functionalities described above may be enabled. In some embodiments, the suspension event mode may only be enabled when the vehicle 110 is being operated in a geo-fenced location that is reserved for off-road vehicle operation under a controlled environment.

A general operation of the control algorithm 270 of one example embodiment will be discussed in reference to FIG. 3. In this regard, FIG. 3 illustrates a block diagram of operations that may be associated with execution of the control algorithm 270 of an example embodiment. In this regard, at operation 300, the control algorithm 270 may receive sensor information from the sensor network 160, which may include attitude information among other things. The sensor information may include information indicative of pitch, roll, vehicle speed, suspension droop, ride height, etc. This information may be monitored to determine if a suspension event is detected at operation 310. If not detected, monitoring may continue at operation 300. However, if detected, initiation angle and vehicle speed may be determined at operation 320. Data and/or video regarding the suspension event may then be captured at operation 330 until the suspension event is determined to be ended at operation 340. When the suspension event is ended, the duration time may be calculated along with other suspension event parameters such as the vertical and/or horizontal components of the distance traveled at operation 350. In other words, distance traveled horizontally and/or vertically may be recorded. Thereafter, at operation 360, the suspension event parameters may be either locally or remotely displayed, and the content (e.g., video or other data) may be shared. Monitoring may also resume or continue at operation 300.

A vehicle monitoring system for a vehicle may therefore be provided. The vehicle monitoring system may include a sensor network operably coupled to suspension components of the vehicle and a controller operably coupled to the sensor network to determine a suspension event and vehicle speed, initiation angle and duration time associated with the suspension event. The controller further determines a vertical and/or horizontal component of the distance traveled during the suspension event based on the vehicle speed, initiation angle and duration time.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the controller may further generate an instruction for display of the vertical and/or horizontal component of the distance traveled at a user interface of the vehicle. In an example embodiment, the controller may further generate an instruction for display of the vertical and/or horizontal component of the distance traveled at a user interface remotely located with respect to the vehicle responsive to wireless communication of the instruction. In some cases, the sensor network may include a camera and, the camera may capture video content of the suspension event. In an example embodiment, the video content may be communicated to a user interface that is remotely located with respect to the vehicle responsive to wireless communication of the video content from the vehicle. In some cases, the sensor network may include ride height sensors, and the ride height sensors may provide information used to determine a start and end of the suspension event to determine the duration time associated with the suspension event. In an example embodiment, the sensor network may include an IMU or gyroscope to determine the initiation angle. In some cases, the sensor network may include a camera, radar or lidar, and the vertical component of the distance traveled that is achieved may be determined based on a vertical distance measured above ground during the suspension event detected via the camera, radar or lidar. In an example embodiment, the vehicle speed may be modified based on tire slip to determine the vertical and/or horizontal component of the distance traveled. In some cases, the controller may further determine an ending angle of the vehicle based on a determination of vehicle pitch at the end of the suspension event. In an example embodiment, a GPS elevation is measured at a start and end of the suspension event to determine the vertical and/or horizontal component of the distance traveled during the suspension event based on a change in elevation from the start to the end of the suspension event. In some cases, information recorded in association with the suspension event may be communicated to another vehicle based on the other vehicle being in proximity to a location at which the suspension event occurred.

Figure 4:
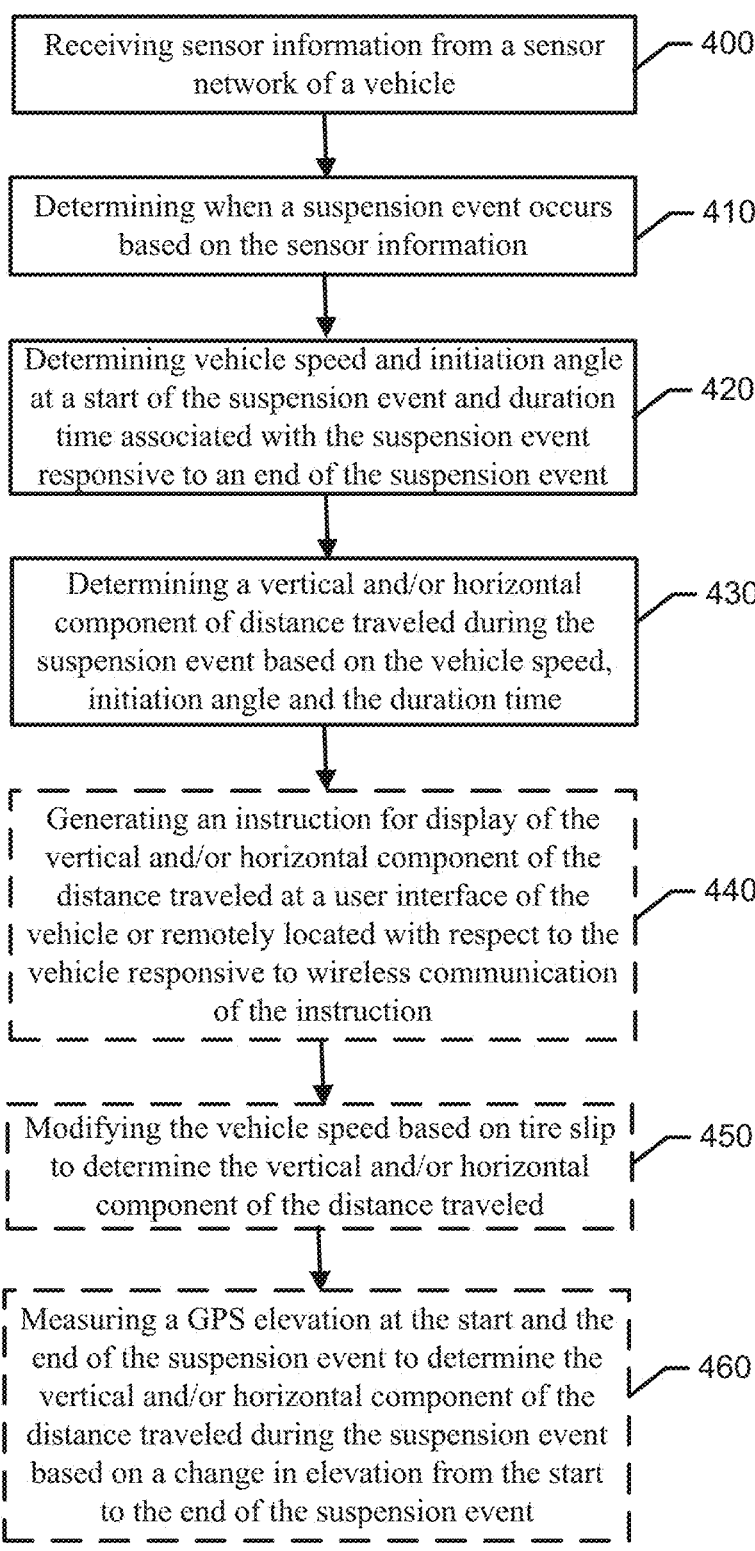
FIG. 4 is a block diagram of a method of determining suspension event parameters in accordance with an example embodiment.

These modifications may also be employed in the context of a method of monitoring vehicle operation for suspension events. An example of such a method is shown in the block diagram of FIG. 4. In this regard, the method may include receiving sensor information from a sensor network of a vehicle at operation 400, determining when a suspension event occurs based on the sensor information at operation 410, determining vehicle speed and initiation angle at a start of the suspension event and duration time associated with the suspension event responsive to an end of the suspension event at operation 420, and determining a vertical and/or horizontal component of the distance traveled during the suspension event based on the vehicle speed, initiation angle and the duration time at operation 430. These operations may be further augmented with optional operations shown in dashed lines in FIG. 4. For example additional optional operations may include generating an instruction for display of the vertical and/or horizontal component of the distance traveled at a user interface of the vehicle or remotely located with respect to the vehicle responsive to wireless communication of the instruction at operation 440, modifying the vehicle speed based on tire slip to determine the vertical and/or horizontal component of the distance traveled at operation 450, or measuring a GPS elevation at the start and the end of the suspension event to determine the vertical and/or horizontal component of the distance traveled during the suspension event based on a change in elevation from the start to the end of the suspension event at operation 460.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle monitoring system comprising:
a sensor network operably coupled to suspension components of the vehicle; and
a controller operably coupled to the sensor network to determine a suspension event and vehicle speed, initiation angle and duration time associated with the suspension event,
wherein the controller further determines a vertical and/or horizontal component of a distance traveled during the suspension event based on the vehicle speed, initiation angle and duration time,
wherein the sensor network includes ride height sensors,
wherein the ride height sensors determine a start and an end of the suspension event based on an amount of suspension droop measured for the vehicle, and
wherein the start and the end of the suspension event is determined responsive to a selection of a suspension event mode and the vehicle being operated in a geo-fenced location that is reserved for off-road vehicle operation.

2. The vehicle monitoring system of claim 1, wherein the controller further generates an instruction for display of the vertical and/or horizontal component of the distance traveled at a user interface of the vehicle, or for display of the vertical and/or horizontal component of the distance traveled at a user interface remotely located with respect to the vehicle responsive to wireless communication of the instruction.

3. The vehicle monitoring system of claim 1, wherein the sensor network includes a camera and, wherein the camera captures video content of the suspension event.

4. The vehicle monitoring system of claim 3, wherein the video content is communicated to a user interface remotely located with respect to the vehicle responsive to wireless communication of the video content from the vehicle.

5. The vehicle monitoring system of claim 1, wherein the sensor network includes an inertial measurement unit (IMU) or gyroscope to determine the initiation angle.

6. The vehicle monitoring system of claim 1, wherein the sensor network comprises a camera, radar or lidar, and
wherein the vertical component of the distance traveled is determined based on a vertical distance measured above ground during the suspension event detected via the camera, radar or lidar.

7. The vehicle monitoring system of claim 1, wherein the vehicle speed is modified based on tire slip to determine the vertical and/or horizontal component of the distance traveled.

8. The vehicle monitoring system of claim 1, wherein the controller further determines an ending angle of the vehicle based on a determination of vehicle pitch at an end of the duration time.

9. The vehicle monitoring system of claim 1, wherein a GPS elevation is measured at a start and end of the suspension event to determine the vertical and/or horizontal component of the distance traveled during the suspension event based on a change in elevation from the start to the end of the suspension event.

10. The vehicle monitoring system of claim 1, wherein information recorded in association with the suspension event is communicated to another vehicle based on the other vehicle being in proximity to a location at which the suspension event occurred.

11. A method of monitoring vehicle operation for a suspension event, the method comprising:

receiving sensor information from a sensor network of the vehicle;

determining when a suspension event occurs based on the sensor information;

determining vehicle speed and initiation angle at a start of the suspension event and duration time associated with the suspension event responsive to an end of the suspension event; and determining a vertical and/or horizontal component of distance traveled during the suspension event based on the vehicle speed, initiation angle and the duration time, wherein the determining of the vertical and/or horizontal component of the distance traveled is calculated using a modified vehicle speed, wherein the modified vehicle speed is the vehicle speed corrected for tire slip, and wherein the start of the suspension event and the end of the suspension event is determined by a vehicle ride height being over a ride height threshold for a predetermined period of time and camera detection of a vertical distance above ground.

12. The method of claim 11, further comprising generating an instruction for display of the vertical and/or horizontal component of the distance traveled at a user interface of the vehicle.

13. The method of claim 11, further comprising generating an instruction for display of the vertical and/or horizontal component of the distance traveled at a user interface remotely located with respect to the vehicle responsive to wireless communication of the instruction.

14. The method of claim 11, wherein the sensor network includes a camera, wherein the camera captures video content of the suspension event, and wherein the video content is communicated to a user interface remotely located with respect to the vehicle responsive to wireless communication of the video content from the vehicle.

15. The method of claim 11, wherein the sensor network includes ride height sensors, and wherein the ride height sensors determine the start and the end of the suspension event based on suspension droop measured for the vehicle.

16. The method of claim 11, wherein the sensor network includes an inertial measurement unit (IMU) or gyroscope to determine the initiation angle.

17. The method of claim 11, wherein the sensor network comprises a camera, radar or lidar, and wherein the vertical component of the distance traveled is determined based on a vertical distance measured above ground during the suspension event detected via the camera, radar or lidar.

18. The method of claim 11, further comprising measuring a GPS elevation at the start and the end of the suspension event to determine the vertical and/or horizontal component of the distance traveled during the suspension event based on a change in elevation from the start to the end of the suspension event.

19. A vehicle monitoring system comprising:

a sensor network operably coupled to suspension components of the vehicle; and a controller operably coupled to the sensor network to determine a suspension event and vehicle speed, initiation angle and duration time associated with the suspension event, wherein the controller further determines a vertical and/or horizontal component of a distance traveled during the suspension event based on the vehicle speed, initiation angle and duration time, wherein the sensor network comprises a camera, radar or lidar, wherein the vertical component of the distance traveled is determined based on a vertical distance measured above ground after maximum suspension droop during the suspension event detected via the camera, radar or lidar, and wherein the maximum suspension droop is a ride height where the vehicle is not exerting any contact forces on the ground determined via the sensor network.

* * * * *